(12) United States Patent
Sakamoto

(10) Patent No.: US 8,865,787 B2
(45) Date of Patent: Oct. 21, 2014

(54) PHOTOCURABLE SILICONE GEL COMPOSITION AND APPLICATION THEREOF

(75) Inventor: Yasunori Sakamoto, Tokyo (JP)

(73) Assignee: Threebond Fine Chemical Co., Ltd., Kanagawa (JP)

(*) Notice: Subject to any disclaimer, the term of this patent is extended or adjusted under 35 U.S.C. 154(b) by 181 days.

(21) Appl. No.: 13/643,141

(22) PCT Filed: Apr. 25, 2011

(86) PCT No.: PCT/JP2011/060051
§ 371 (c)(1),
(2), (4) Date: Oct. 24, 2012

(87) PCT Pub. No.: WO2011/136170
PCT Pub. Date: Nov. 3, 2011

(65) Prior Publication Data
US 2013/0042973 A1 Feb. 21, 2013

(30) Foreign Application Priority Data
Apr. 26, 2010 (JP) ................................ 2010-101249

(51) Int. Cl.
*C08K 5/548* (2006.01)
*C08L 83/04* (2006.01)
*C08K 5/3435* (2006.01)
*C09J 5/00* (2006.01)
*C08G 77/28* (2006.01)
*C09K 3/10* (2006.01)
*C08G 77/20* (2006.01)

(52) U.S. Cl.
CPC ............... *C08L 83/04* (2013.01); *C08G 77/28* (2013.01); *C09J 2483/00* (2013.01); *C09K 2003/1062* (2013.01); *C09J 2205/31* (2013.01); *C08K 5/3435* (2013.01); *C09K 3/1018* (2013.01); *C09J 5/00* (2013.01); *C08G 77/20* (2013.01); *C08K 5/548* (2013.01)
USPC .......................................... 522/75; 156/272.2

(58) Field of Classification Search
CPC ...... C08K 5/3435; C08K 5/548; B32B 37/06; C09D 183/08; C09J 5/00
USPC ................. 156/272.2, 275.5; 522/75
See application file for complete search history.

(56) References Cited

U.S. PATENT DOCUMENTS

| | | | | |
|---|---|---|---|---|
| 4,810,731 A | * | 3/1989 | Hida et al. ............... | 522/33 |
| 4,935,455 A | * | 6/1990 | Huy et al. ............... | 522/99 |
| 2003/0124338 A1 | * | 7/2003 | Inagaki et al. ............ | 428/317.9 |
| 2008/0071023 A1 | | 3/2008 | Tabei | |

FOREIGN PATENT DOCUMENTS

| | | |
|---|---|---|
| CN | 101143930 A | 3/2008 |
| JP | 62161856 A | 7/1987 |
| JP | 03074463 A | 3/1991 |
| JP | 06184257 A | 7/1994 |
| JP | 07088430 A | 4/1995 |
| JP | 08225743 A | 9/1996 |
| JP | 2002327799 A | 11/2002 |
| JP | 2006002087 A | 1/2006 |

OTHER PUBLICATIONS

Office Action, dated for Jan. 6, 2014, issued by the State Intellectual Property Office of the People's Republic of China in counterpart Chinese Application No. 201180021118.7.
Chen, Yan, "GUV-1051 Ultraviolet Curing Optical Fiber Coating," Silicone and Fluorine Information, No. 5, May 25, 2005, p. 30.
International Search Report dated Aug. 2, 2011 issued in International Application No. PCT/JP2011/060051 (PCT/ISA/210).
Written Opinion dated Aug. 2, 2011 issued in International Application No. PCT/JP2011/060051 (PCT/ISA/237).
Extended European Search Report dated Oct. 4, 2013 issued by the European Patent Office in counterpart European Application No. 11774951.5.

\* cited by examiner

*Primary Examiner* — Daniel McNally
(74) *Attorney, Agent, or Firm* — Sughrue Mion, PLLC

(57) ABSTRACT

The present invention relates to a photocurable silicone gel composition includes: (A) an organopolysiloxane having at least one group represented by the following general formula (1): in which $R^1$ and $R^2$ each represent hydrogen or an alkyl group having a carbon number of 1 to 20, in an amount of 100 parts by mass; (B) a mercaptoalkyl group-containing organopolysiloxane in an amount of parts by mass such that the number of moles of the mercaptoalkyl group is 0.01 to 1.0 mole per 1 mole of the group represented by the general formula (1) in the component (A); (C) a photopolymerization initiator in an amount of 0.01 to 20 parts by mass per 100 parts by mass of the component (A); and (D) a hindered amine compound having a group represented by the following general formula (2): in which $R^3$ to $R^6$ each represent hydrogen or an alkyl group having a carbon number of 1 to 20, and $R^7$ represents hydrogen or —$CH_2$—$R^8$ in which $R^8$ represents hydrogen or a monovalent organic group, in an amount of 0.001 to 10 parts by mass per 100 parts by mass of the component (A):

[Chem. 1]

$$CH_2\!=\!CH\!-\!\underset{\underset{R^2}{|}}{\overset{\overset{R^1}{|}}{Si}}\!-\!\!\!, \qquad (1)$$

[Chem. 2]

$$\begin{array}{c} R^3 \;\; R^4 \\ \diagdown \;\; \diagup \\ \diagup \;\; \diagdown \\ R^5 \;\; R^6 \end{array}\!\!\!\!N\!-\!R^7. \qquad (2)$$

8 Claims, No Drawings

PHOTOCURABLE SILICONE GEL COMPOSITION AND APPLICATION THEREOF

TECHNICAL FIELD

The present invention relates to a photocurable silicone gel composition that can be cured by irradiation with light and also relates to a cured product thereof. Specifically, the invention relates to an excellent photocurable silicone gel composition that undergoes little change in physical properties even when allowed to stand at high temperature and high humidity for a long period of time; a cured product thereof; and the application thereof.

BACKGROUND OF THE INVENTION

A silicone gel has a low elastic modulus and excellent mechanical strength and is also excellent in terms of heat resistance, cold resistance, and the like. Therefore, it has been used in a wide range of fields, including adhesives for various electrical/electronic parts, sealing agents, potting materials, coating materials, damping materials for use in optical pickup devices, and the like.

As a damping material for use in an optical pickup, a specific additional reaction-curable silicone gel has been proposed as described in Patent Document 1. However, there is a problem of low productivity because of the heated reaction. When a mercaptoalkyl group-containing polyorganosiloxane as described in Patent Document 2 is used, curing proceeds more rapidly upon irradiation with light. However, there is a problem in that the cured product undergoes softening degradation when exposed to high temperature and high humidity for a long period of time. That is, the penetration value increases, whereby the damping performance deteriorates or the cured product flows out. Patent Document 3 proposes a photocurable organopolysiloxane obtained by a reaction of an organopolysiloxane containing a terminal amino group with a (meth)acrylic group-containing isocyanate. However, there also is a similar problem in that it undergoes softening degradation when allowed to stand at high temperature and high humidity.

As the sealing agent, Patent Document 4 discloses that a sealing agent containing a photocurable gel, which is a photocurable organopolysiloxane obtained by a reaction of an organopolysiloxane containing a terminal amino group with a vinyl group-containing isocyanate, is used for mobile phones, waterproof watches, waterproof miniature switches, waterproof small resistors, hard disk covers, etc. However, the composition disclosed therein is not suitable for sealing applications for use at high temperature and high humidity. This is because this composition undergoes softening degradation at high temperature and high humidity, causing a problem of decreased sealing performance.

BACKGROUND ART

Patent Document

Patent Document 1: JP-A-8-225743
Patent Document 2: JP-A-62-161856
Patent Document 3: JP-A-6-184257
Patent Document 4: JP-A-7-88430

SUMMARY OF THE INVENTION

Problems that the Invention is to Solve

An object of the invention is to provide a photocurable silicone composition which rapidly cures upon irradiation with light and, in the form of a cured product after curing, undergoes little change in physical properties even when allowed to stand at high temperature and high humidity for a long period of time, and which thus can be used as a damping material for an optical pickup, a sealing agent, or the like; and the application thereof.

Means for Solving the Problems

As a result of assiduous studies, it has been found that the above object can be achieved by a specific silicone gel composition, and the invention has thus been accomplished.

The gist of the invention will be described below. The first embodiment of the invention provides a photocurable silicone gel composition comprising:

(A) an organopolysiloxane having at least one group represented by the following general formula (1):

[Chem. 1]

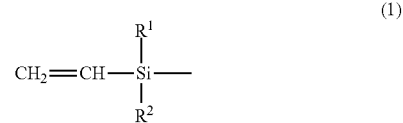

(1)

wherein $R^1$ and $R^2$ each represent hydrogen or an alkyl group having a carbon number of 1 to 20, in an amount of 100 parts by mass;

(B) a mercaptoalkyl group-containing organopolysiloxane in an amount of parts by mass such that the number of moles of the mercaptoalkyl group is 0.01 to 1.0 mole per 1 mole of the group represented by the general formula (1) in the component (A);

(C) a photopolymerization initiator in an amount of 0.01 to 20 parts by mass per 100 parts by mass of the component (A); and (D) a hindered amine compound having a group represented by the following general formula (2):

[Chem. 2]

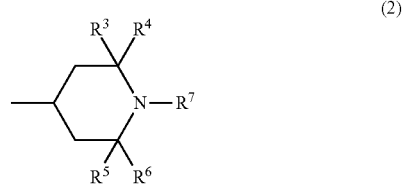

(2)

wherein $R^3$ to $R^6$ each represent hydrogen or an alkyl group having a carbon number of 1 to 20, and $R^7$ represents hydrogen or $-CH_2-R^8$ in which $R^8$ represents hydrogen or a monovalent organic group, in an amount of 0.001 to 10 parts by mass per 100 parts by mass of the component (A).

The second embodiment of the invention provides a photocurable silicone gel composition according to the first embodiment, wherein the component (A) has a viscosity at 25° C. of 10 to 100,000 cps or less.

The third embodiment of the invention provides a photocurable silicone gel composition according to the first or second embodiment, wherein the component (B) is a mercaptoalkyl group-containing organopolysiloxane including a $(CH_3)_3SiO_{1/2}$ unit, a $(CH_3)(HS(CH_2)n)SiO_{2/2}$ unit in which n is an integer of 2 to 20, and a $(CH_3)_2SiO_{2/2}$ unit.

The fourth embodiment of the invention provides a photocurable silicone gel composition according to any one of the first to third embodiments, for use as a damping material for an optical pickup.

The fifth embodiment of the invention provides a photocurable silicone gel composition according to any one of the first to third embodiments, for use as a sealing agent.

The sixth embodiment of the invention provides a photocurable silicone gel composition according to any one of the first to third embodiments, for use as a sealing agent for an in-vehicle electronic device.

The seventh embodiment of the invention provides the damping material for an optical pickup, comprising a cured product obtained by curing the photocurable silicone gel composition according to any one of the first to third embodiments by irradiation with light.

The eighth embodiment of the invention provides a method for sealing, comprising:

applying the photocurable silicone gel composition according to the first or second embodiment to an article to be sealed;
curing the photocurable silicone gel composition by irradiation with light; and
joining a resulting cured product to an opposing article to be sealed to contact the articles by pressuring.

Advantage of the Invention

The invention mentioned above has excellent photocurability and, in the form of a cured product after curing, does not undergo softening degradation even when allowed to stand at high temperature and high humidity for a long period of time. That is, in the case of use as a damping material for an optical pickup, such a damping material has excellent productivity and also undergoes little change in physical properties even when allowed to stand at high temperature and high humidity for a long period of time. Therefore, stable damping performance can be maintained. In addition, in the case of use as a sealing agent, such a sealing agent undergoes little change in physical properties even when allowed to stand at high temperature and high humidity for a long period of time. Therefore, stable sealing performance can be obtained.

MODE FOR CARRYING OUT THE INVENTION

Hereinafter, the invention will be described in detail.

An organopolysiloxane as the component (A) is a main component of the photocurable silicone gel composition of the invention and has at least one group represented by the following general formula (1).

[Chem. 3]

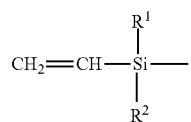

(1)

The position of attachment of the group represented by the general formula (1) in the component (A) is not limited, and may be a terminal or a side chain of the molecular chain, for example. Examples of other organic groups bonded to a silicon atom in addition to the group represented by the general formula (1) in the component (A) include those substituted with a methyl group or a phenyl group.

The molecular structure of the component (A) is substantially linear, and may also be partially branched. Examples of such components (A) include dimethylsiloxane end-capped with a dimethylvinylsiloxy group; a copolymer of dimethylsiloxane end-capped with a dimethylvinylsiloxy group and diphenylsiloxane; a copolymer of dimethylsiloxane end-capped with a dimethylvinylsiloxy group, methylvinylsiloxane, and diphenylsiloxane; dimethylsiloxane capped with a dimethylvinylsiloxy group at one chain end and a trimethylsiloxy group at the other chain end; dimethylsiloxane capped with a dimethylvinylsiloxy group at one chain end and a trimethylsiloxy group at the other chain end; methylvinylsiloxane-diphenylsiloxane; a copolymer of dimethylsiloxane capped with trimethylsiloxy groups at both chain ends and methylvinylsiloxane; and a copolymer of dimethylsiloxane capped with trimethylsiloxy groups at both chain ends, methylvinylsiloxane, and diphenylsiloxane. They may be used alone, and it is also possible to use two or more kinds together.

The organopolysiloxane as the component (A) has a viscosity at 25° C. of 10 to 100,000 cps, preferably 100 to 50,000 cps. The viscosity of less than 10 cps causes a problem in the self-maintaining properties of the cured product. When the viscosity is more than 100,000 cps, such a photocurable silicone gel composition of the invention is difficult to handle, resulting in poor working properties.

The molecular weight of the organopolysiloxane as the component (A) is preferably 1,000 to 500,000, and more preferably 10,000 to 100,000. The molecular weight of less than 1,000 causes a problem in the self-maintaining properties of the cured product. When the molecular weight is more than 500,000, such a photocurable silicone gel composition of the invention is difficult to handle, resulting in poor working properties. Further, damping characteristics are affected. Incidentally, in the present specification, "molecular weight" refers to weight-average molecular weight (Mw) in terms of polystyrene measured by gel permeation chromatography (GPC).

The component (B) is an organopolysiloxane containing a mercaptoalkyl group, and is, for example, an organopolysiloxane substituted with a mercaptoalkyl group in a terminal or a side chain of the molecular chain. It is preferable that the component (B) is a mercaptoalkyl group-containing organopolysiloxane including a $(CH_3)_3SiO_{1/2}$ unit, a $(CH_3)(HS(CH_2)n)SiO_{2/2}$ unit (n is an integer of 2 to 20), and a $(CH_3)_2SiO_{2/2}$ unit. It is preferable that the average number of $HS(CH_2)n$ (n is an integer of 2 to 20) groups present in one molecule is more than 3. When the number is smaller, curability deteriorates. Examples of mercaptoalkyl groups include mercaptoethyl, mercaptopropyl, and mercaptohexyl groups.

The molecular weight of the component (B) is preferably 1,000 or more, and more preferably 5,000 or more. When the molecular weight is less than 1,000, the cured product has low physical strength.

It is preferable that in the component (B), the ratio between the $(CH_3)(HS(CH_2)n)SiO_{2/2}$ (n is an integer of 2 to 20) and $(CH_3)_2SiO_{2/2}$ units is within a range of 1:99 to 50:50. When the proportion of the $(CH_3)(HS(CH_2)n)SiO_{2/2}$ (n is an integer of 2 to 20) unit is less than this range, curability extremely decreases. In addition, when the proportion of the $(CH_3)(HS(CH_2)n)SiO_{2/2}$ (n is an integer of 2 to 20) unit is more than this range, long-term durability cannot be maintained.

The amount of the component (B) incorporated is such that the number of moles of the mercaptoalkyl group in the component (B) is 0.01 to 1.0 mole, preferably 0.1 to 1.0 mole, per 1 mole of the group represented by the general formula (1) in the component (A). When the number of moles is less than 0.01, curability decreases. When it is more than 1.0, hardness is so high that the cured product is no longer a gel, whereby the object of the invention is not satisfied.

As a photopolymerization initiator as the component (C), known ones are usable. The photopolymerization initiator as the component (C) for use in the invention promotes the reaction between the vinyl group in the component (A) and the mercaptoalkyl group in the component (B) under irradiation with light. Examples thereof include those well known in the art, such as 1-hydroxy-cyclohexyl-phenyl-ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-{4-(methylthio)phenyl}-2-morpholino-propan-1-one, 2,4,6-trimethylbenzoyldiphenylphosphine oxide, and bis-(2,6-dimethoxybenzoyl)-2,4,4-trimethylpentylphosphine oxide; IRGACURE 184, 369, 651, 500, and 907 and DAROCUR 1173 (all manufactured by BASF); and LUCIRIN TPO (manufactured by BASF). In particular, in terms of reactivity, acetophenone-based ones are preferable. The component (C) may be used alone, and it is also possible to use two or more kinds together.

The amount of the component (C) incorporated is an amount effective in initiating a photoreaction, and is generally 0.01 to 20 parts by mass per 100 parts by mass of the component (A).

A hindered amine compound as the component (D) is a main component of the invention, which suppresses the problem of softening degradation due to high temperature and high humidity. It is important that the hindered amine compound has a group represented by general formula (2).

[Chem. 4]

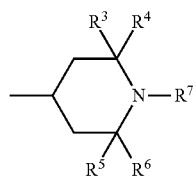

(2)

(In the formula, $R^3$ to $R^6$ each represent hydrogen or an alkyl group having a carbon number of 1 to 20, and $R^7$ represents hydrogen or —$CH_2$—$R^8$ ($R^8$ represents hydrogen or a monovalent organic group)). Examples of organic groups herein include, but are not limited to, hydroxy, linear or branched alkyl, cycloalkyl, aryl, alkoxy, halogen, ester, carboxy, aldehyde, amino, imino, imide, nitrile, amide, imide, cyano, sulfo, nitro, sulfide, thiol, isocyanate, and nitro groups.

In the case where a hindered amine compound having no group represented by the general formula (2) in the molecule thereof is used, softening degradation occurs upon standing at high temperature and high humidity for a long period of time. Therefore, it is not applicable as a damping material or a sealing agent.

Specific examples of commercially available hindered amine compounds (D) include TINUVIN 765 (a mixture of bis(1,2,2,6,6-pentamethyl-4-piperidyl)sebacate and methyl 1,2,2,6,6-pentamethyl-4-piperidyl sebacate), TINUVIN 111 FDL (a mixture of: a polymer of dimethyl succinate and 4-hydroxy-2,2,6,6-tetramethyl-1-piperidine ethanol; and N',N'',N'''-tetrakis(4,6-bis-(butyl-(N-methyl-2,2,6,6-tetramethylpiperidin-4-yl)amino)-triazin-2-yl)-4,7-diazadecane-1,10-diamine), and TINUVIN 144 (bis(1,2,2,6,6-pentamethyl-4-piperidyl)[[3,5-bis(1,1-dimethylethyl)-4-hydroxyphenyl]methyl]butylmalonate) (all manufactured by Ciba Specialty Chemicals); and ADK STAB LA-52 (tetrakis(1,2,2,6,6-pentamethyl-4-piperidyl)1,2,3,4-butanetetracarboxylate), ADK STAB LA-57 (tetrakis(1,2,2,6,6-pentamethyl-4-piperidyl)butane-1,2,3,4-butanetetracarboxylate), ADK STAB LA-62 (1,2,2,6,6-pentamethyl-4-piperidyl and tridecyl-1,2,3,4-butanetetracarboxylate), ADK STAB LA-67 (a condensate of 2,2,6,6-tetramethyl-piperidinol, tridecyl alcohol, and 1,2,3,4-butanetetracarboxylic acid), ADK STAB LA-68LD (a condensate of 1,2,3,4-butanetetracarboxylic acid, 2,2,6,6-tetramethyl-4-piperidinol, and β,β,β,β-tetramethyl-3,9-(2,4,8,10-tetraoxaspiro[5,5]undecane)-diethanol), ADK STAB LA-82 (1,2,2,6,6-pentamethyl-4-piperidyl methacrylate), and ADK STAB LA-87 (2,2,6,6-tetramethyl-4-piperidyl methacrylate) (all manufactured by Asahi Denka). Among them, TINUVIN 765, TINUVIN 111 FDL, and TINUVIN 144 are preferable. They may be used alone, and it is also possible to use two or more kinds together.

The amount of the component (D) incorporated is 0.001 to 10 mass, preferably 0.01 to 7 parts by weight, and more preferably 0.05 to 5 parts by weight per 100 parts by mass of the component (A). An amount of less than 0.001 parts by mass leads to low effectiveness in suppressing the softening degradation due to high temperature and high humidity. An amount of more than 10 parts by mass leads to poor curability, resulting in bleed-out.

Incidentally, as long as the object of the invention is not impaired, the photocurable silicone gel composition of the invention may have added thereto other optional components as necessary, including various fillers, heat stabilizers, flame retardants, anti-gelling agents, physical property modifiers, organic solvents, etc.

Examples of fillers include inorganic fillers, such as fumed silica, rubber particles, silicone resin, glass beads, and quartz powder, and electrically conductive or thermally conductive fillers, such as metals and metal compounds.

A fumed silica filler is incorporated for the purpose of improving the mechanical strength of the cured product. Preferred examples thereof include those hydrophobized with an organochlorosilane, polyorganosiloxane, hexamethyldisilazane, or the like.

Specific examples of fumed silicas include commercially available products such as AEROSIL R974, R972, R972V, R972CF, R805, R812, R812S, R816, R8200, RY200, RX200, RY200S, #130, #200, #300, and 8202 (trade name) manufactured by Nippon Aerosil and those of the Nipsil SS series (trade name) manufactured by Nippon Silica.

It is preferable that the amount of the filler incorporated is about 0.1 to 20 parts by mass per 100 parts by mass of the component (A). When the amount is less than 0.1 parts by mass, its effectiveness is low, while when the amount is more than 20 parts by mass, such a photocurable silicone gel composition of the invention has poor fluidity, resulting in decreased working properties.

Examples of heat stabilizers include phenolic antioxidants, thioether antioxidants, and phosphorus antioxidants.

Examples of phenolic antioxidants include, but are not particularly limited to, monophenols such as 2,6-di-t-butyl-p-cresol, 2-t-butyl-4-methoxyphenol, 3-t-butyl-4-methoxyphenol, and 2,6-t-butyl-4-ethylphenol, bisphenols such as 2,2'-methylene-bis(4-methyl-6-t-butylphenol), 4,4'-thiobis(3-methyl-6-t-butylphenol), and 4,4'-butylidene-bis(3-methyl-6-t-butylphenol); and polymeric phenols such as 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis[methylene-3-(3',5'-di-t-butyl-4'-hydroxyphenyl)propionate]methane, bis[3,3'-bis(4'-hydroxy-3-t-butylphenyl)butyric acid glycol ester, and tocopherol (vitamin E).

Examples of thioether antioxidants include, but are not particularly limited to, thioether antioxidants such as MARK PEP-36 and MARK AO-23 (all manufactured by Adeka Argus Chemical).

Examples of phosphorus antioxidants include, but are not particularly limited to, Irgafos 38, Irgafos 168, and Irgafos P-EPQ (all manufactured by Ciba-Geigy Japan).

Examples of flame retardants include, but are not particularly limited to, magnesium hydroxide, aluminum hydroxide, phosphorus-based flame retardants such as ammonium polyphosphate and red phosphorus, nitrogen-based flame retardants such as melamine cyanurate and melamine sulfate, silicone-based flame retardants such as silicone powder and organopolysiloxanes, and zinc borate.

As anti-gelling agents, dark reaction inhibitors are usable, examples thereof including hydroquinone, p-methoxyphenol, t-butylcatechol, and phenothiazin.

As physical property modifiers, various silane coupling agents are added as necessary. Examples thereof include alkylalkoxysilanes such as methyltrimethoxysilane, dimethyldimethoxysilane, trimethylmethoxysilane, and n-propyltrimethoxysilane; alkylisopropenoxysilanes such as dimethyldiisopropenoxysilane, methyltriisopropenoxysilane, and γ-glycidoxypropylmethyldiisopropenoxysilane; functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane, and γ-mercaptopropylmethyldimethoxysilane; silicone varnishes; and polysiloxanes. By using such a physical property modifier, the curability, adhesion, sealing properties, and the like of the photocurable silicone gel composition of the invention can be prepared.

Examples of organic solvents include, but are not particularly limited to, hexane, heptane, toluene, and xylene.

The production method for the photocurable silicone gel composition of the invention is not particularly limited, and a known method can be applied. For example, it can be produced by kneading the components and optional additive components using a kneader that allows for temperature control, such as a single-screw extruder, a twin-screw extruder, a planetary mixer, a twin-screw mixer, or a high-shear mixer.

The photocurable silicone gel composition can be applied to a member of an adherend or the like by any method using a coating liquid adjusted to a desired viscosity by controlling the temperature of the photocurable silicone gel composition as necessary. For example, it is possible to use a method such as gravure coating, roll coating, spin coating, screen coating, blade coating, dipping, dispensing, or ink-jetting.

The light source for curing the photocurable silicone gel composition of the invention by irradiation with light is not particularly limited and may be, for example, a low-pressure mercury lamp, a medium-pressure mercury lamp, a high-pressure mercury lamp, an ultrahigh-pressure mercury lamp, a black light lamp, an microwave-excited mercury lamp, a metal halide lamp, a sodium lamp, a halogen lamp, a xenon lamp, an LED, a fluorescent lamp, sunlight, an electron beam irradiator, or the like. In terms of the characteristics of the cured product, the dose of light irradiation is preferably 10 $kJ/m^2$ or more, and more preferably 15 $kJ/m^2$ or more.

(Damping Material for Optical Pickup)

The photocurable silicone gel composition of the invention can be used as a damping material for an optical pickup using the following method.

In order for a cured product obtained by curing the photocurable silicone gel composition of the invention by irradiation with light to be used as a damping material for an optical pickup, damping characteristics are required. Damping characteristics are determined from tan δ (loss factor) and G* (complex modulus), which can be measured with a rheometer. Generally, with respect to tan δ of a silicone gel, a gel of a composition whose tan δ value increases from the initial value after high-temperature and high-humidity conditions (85° C., 85% RH) has low shape retentivity. Therefore, its shape changes upon strong vibration or impact. In addition, generally, the desired G* value of a silicone gel is selected according to each specific product. Therefore, the quality is not necessarily determined by whether the values are high or low. However, it is considered good when a value does not change from the initial value after high-temperature and high-humidity conditions (85° C., 85% RH).

In the cured product of the photocurable silicone gel composition of the invention, the variation is small between the initial damping characteristics and the damping characteristics after high-temperature and high-humidity conditions (85° C., 85% RH). Accordingly, stable damping characteristics can be maintained.

A damping material for an optical pickup made of the cured product obtained by curing the photocurable silicone gel composition of the invention by irradiation with light is particularly suitable for a pickup of a disk device for use in vehicles, which is allowed to stand at high temperature and high humidity, such as 85° C. and 85% RH, for a long period of time.

Applications of such a disk device for use in vehicles include, but are not limited to, the reproduction of information recorded on a disk media such as a DVD, a BD (Blu-ray Disc), a CD, or an MD.

(Sealing Agent)

The photocurable silicone gel composition of the invention can be used as a sealing agent using the following method. That is, the photocurable silicone gel composition is applied to a flange, which is an article to be sealed, and then irradiated with light to cure the photocurable silicone gel composition. The sealing agent in the form of a cured product is joined to a flange portion of an opposing article to be sealed to contact the articles by pressuring.

In the cured product of the photocurable silicone gel composition of the invention, the variation is small between the initial sealing properties and the sealing properties after high-temperature and high-humidity conditions (85° C., 85% RH). Accordingly, stable sealing performance can be maintained.

Further, in sealing applications for use under high-temperature and high-humidity conditions for a long period of time, in order for sealing performance to be reliably exhibited, it is preferable that pressure-contacting is performed with such force that the compressibility of the sealing agent is 10% or more, still more preferably 10 to 90%. In sealing applications for standing at high temperature and high humidity for a long period of time, sealing properties are impaired when compression is less than 10%.

The flange portion of an article to be sealed may be a resin or a metal, for example. Resins are not particularly limited, and examples thereof include polyolefin resins such as polyethylene and polypropylene, EPDM (ethylene-propylene-diene copolymer), PPS (polyphenylene sulfide), polyimide resin, fluororesin, PEEK (polyetheretherketone), PES (polyethersulfone), PBT (polybutylene terephthalate), PPS (polyphenylene sulfide), and PA (polyamide). Metals are not particularly limited, and examples thereof include, but are not limited to, iron, steel plated with an aluminum-zinc alloy, stainless steel, aluminum, aluminum alloys, magnesium, and magnesium alloys.

Specific applications of the invention are as follows. The invention is particularly suitable for the sealing of a case for in-vehicle electronic devices, adhesion and sealing of automotive parts where various liquid gaskets and the like are used, and adhesive sealing of parts of electrical/electronic devices such as household appliances and mobile devices.

In-vehicle electronic devices are allowed to stand at high temperature and high humidity for a long period of time, such as at a high temperature of more than 120° C. or under conditions of 85° C. and 85% RH. Therefore, the photocurable silicone gel composition of the invention is suitable for such application. By sealing with the cured product of the photocurable silicone gel composition of the invention, a case for mounting an in-vehicle electronic device, which has excellent waterproofness, sealing performance, and safety, can be obtained.

Applications to household appliances and mobile devices include applications exposed to high temperature and high humidity, such as water heaters, rice cookers, microwaves, and steam microwave ovens, and applications required to be waterproof, such as mobile phones, waterproof watches, waterproof miniature switches, waterproof small resistors, and hard disk covers. By sealing with the cured product of the photocurable silicone gel composition of the invention, household appliances and mobile devices having excellent durability, waterproofness, and airtightness can be obtained.

EXAMPLES

Hereinafter, the invention will be described in further detail with reference to examples. However, the invention is not limited to these examples.

Components used in examples and comparative examples are as follows.

Component (A)

(a1) Organopolysiloxane base 1: Dimethylsiloxane end-capped with a dimethylvinylsiloxy group (molecular weight: 43,000, viscosity: 3,500 cps)

(a2) Organopolysiloxane base 2: Copolymer of dimethylsiloxane end-capped with a dimethylvinylsiloxy group and diphenylsiloxane (molecular weight: 62,000, viscosity: 10,000 cps)

(a3) Organopolysiloxane base 3: Dimethylsiloxane end-capped with a dimethylvinylsiloxy group (molecular weight: 72,000, viscosity: 20,000 cps)

<Comparative Component for Component A>

(a'1) Organopolysiloxane base 4: 16.3 g of aminopropylmethyldimethoxysilane is added dropwise to 2000 g of silanol-terminated polydimethylsiloxane (molecular weight: 10,000) while stirring at 100° C. for 2 hours under a nitrogen purge. Subsequently, a vacuum was applied to remove possibly remaining unreacted aminopropylmethyldimethoxysilane, thereby giving di(polydimethylsiloxane) having an amino group at one end with a viscosity of 10,000 cps. 1.54 g of 2-isocyanatoethy methacrylate was added to 200 g of the di(polydimethylsiloxane) and stirred at 50° C. for 1 hour under a nitrogen purge to cause a reaction. As a result, an organopolysiloxane having a terminal (meth)acrylic group was obtained.

Component (B)

(b1) Mercaptopropyl group-containing organopolysiloxane: Copolymer of dimethylsiloxane end-capped with a trimethylsiloxy group and mercaptopropylmethylsiloxane (molecular weight: 10,000, viscosity: 170 cps)

Component (C)

(c1) 2-Hydroxy-2-methyl-1-phenyl-propan-1-one: DAROCURE 1173 (manufactured by BASF)

(c2) 1-Hydroxy-cyclohexyl-phenyl-ketone: IRGACURE 184 (manufactured by BASF)

Component (D)

(d1) Hindered amine 1: TINUVIN 765 (manufactured by BASF) . . . mixture of general formulae (3) and (4)

(d2) Hindered amine 2: TINUVIN 111 FDL (manufactured by BASF) . . . mixture of general formulae (5) and (6)

(d3) Hindered amine 3: TINUVIN 144 (manufactured by BASF) . . . general formula (7)

<Comparative Component for Component D>

(d'1) Hindered amine 4: TINUVIN 123 (manufactured by BASF) . . . general formula (8)

(d'2) Hindered phenol 1: IRGANOX 1135 (manufactured by BASF) . . . general formula (9)

(d'3) Hindered phenol 2: IRGANOX 1010 (manufactured by BASF) . . . general formula (10)

(d'4) Hindered phenol 3: IRGANOX 1035 (manufactured by BASF) . . . general formula (11)

[Chem. 5]

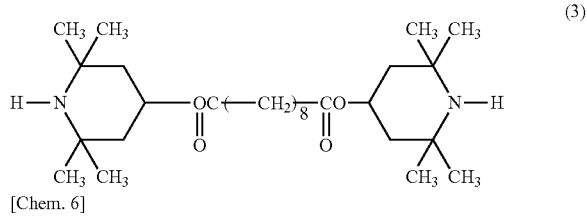

[Chem. 6]

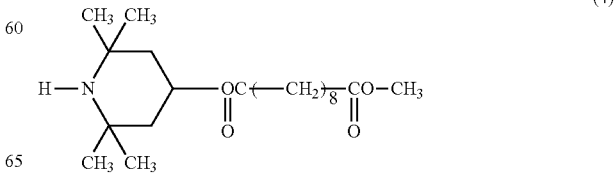

-continued

[Chem. 7]

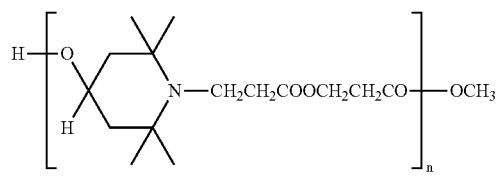

[Chem. 8]

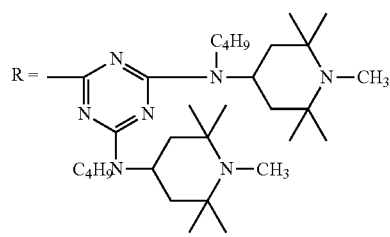

[Chem. 9]

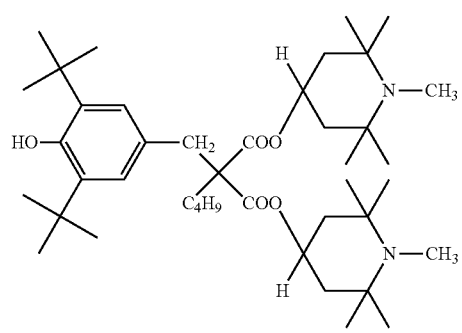

[Chem. 10]

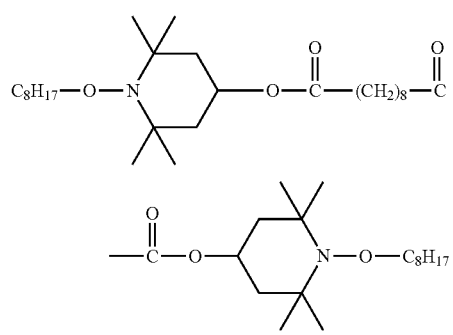

[Chem. 11]

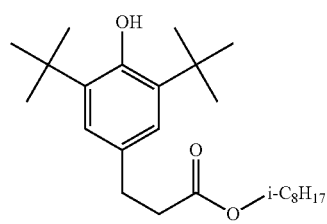

-continued

[Chem. 12]

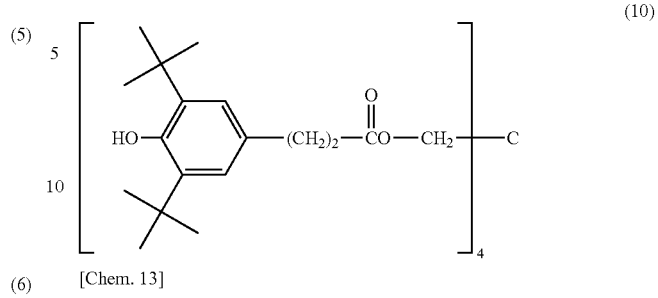

(10)

[Chem. 13]

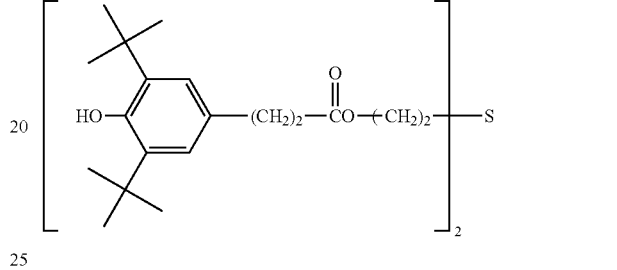

(11)

<Other Optional Components>

Fumed silica: AEROSIL R972 (manufactured by Nippon Aerosil Co., Ltd) (average primary particle size: 16 nm, BET specific surface area: 130 m$^2$/g)

Test methods used in examples and comparative examples are as follows.

<Preparation of Photocurable Silicone Gel Composition>

The components were collected in the amounts (parts by mass) shown in Tables 1 to 4, and mixed in a planetary mixer at room temperature to prepare photocurable silicone gel compositions. The physical properties were measured as follows.

<Penetration Test>

Each photocurable silicone gel composition was UV-irradiated at an integrated light intensity of 30 kJ/m$^2$ using a high-pressure mercury lamp to prepare about 5 g of a cured product. Penetration was measured in accordance with JIS K 2220 (2003) using a ¼ cone (9.38 g). The results are shown in Tables 1 to 4.

<Penetration Test after 500 Hours at 85° C. and 85% RH (Humidity)>

A cured product was produced in the same manner as in the above penetration test and allowed to stand at a temperature of 85° C. and a humidity of 85% RH for 500 hours to prepare a sample for measurement. Penetration was measured in accordance with JIS K 2220 (2003) using a ¼ cone (9.38 g). The results are shown in Tables 1 to 4.

<Damping Characteristic Test>

2 g of a cured product was produced by UV irradiation at an integrated light intensity of 30 kJ/m$^2$, and damping properties were measured with a rheometer. Using a rheometer, tan δ and G* at 25° C. and 1 Hz were measured. The results are shown in Tables 1 and 2.

<Damping Characteristic Test after 500 Hours at 85° C. and 85% RH (Humidity)>

A cured product was produced in the same manner as in the above damping characteristic test and allowed to stand at a temperature of 85° C. and a humidity of 85% RH for 500 hours to prepare a sample for measurement. Damping properties were measured with a rheometer. The results are shown in Tables 1 and 2.

<Sealing Property Test>

In a sealing property test, the photocurable silicone gel compositions in the tables were each applied to a pressure-resistant square flange made of aluminum with a flange width of 10 mm and a flange frame size (inside) of 80×80 mm using a dispenser so that the bead width and height were 3.0 mm and 1.5 mm, respectively, followed by curing by UV irradiation at 60 kJ/m² from above. Subsequently, a flat aluminum plate of the same size was placed thereon from above for clamping to a compressibility of 60% and then immersed in water, and the pressure in the flange was gradually raised to test for air leakage under pressure. The pressure increase condition at this time was 0.01 MPa/15 sec. The maximum pressure that did not cause air leakage was defined as pressure resistance. The results are summarized in Tables 3 and 4.

<Sealing Property Test after 500 Hours at 85° C. and 85% RH (Humidity)>

A measurement sample was produced in the same manner as in the above sealing property test and then allowed to stand at a temperature of 85° C. and a humidity of 85% RH for 500 hours. The thus-obtained sample for measurement was immersed in water, and the pressure in the flange was gradually raised to test for air leakage under pressure. The pressure increase condition at this time was 0.01 MPa/15 sec. The maximum pressure that did not cause air leakage was defined as pressure resistance. The results are summarized in Tables 3 and 4.

TABLE 1

| | Constituents | Ex. 1 | Ex. 2 | Ex. 3 | Ex. 4 | Ex. 5 | Ex. 6 | Ex. 7 |
|---|---|---|---|---|---|---|---|---|
| (a1) | Organopolysiloxane base 1 | 100 | 100 | 100 | | 100 | 100 | 100 |
| (a2) | Organopolysiloxane base 2 | | | | 100 | | | |
| (a'1) | Organopolysiloxane base 4 | | | | | | | |
| (b1) | Mercaptopropyl group-containing organopolysiloxane | 6.0 | 6.0 | 6.0 | 4.3 | 6.0 | 6.0 | 6.0 |
| (c1) | 2-Hydroxy-2-methyl-1-phenyl-propan-1-one | 1.0 | 1.0 | 1.0 | 1.0 | 1.0 | 1.0 | |
| (c2) | 1-Hydroxy-cyclohexyl-phenyl-ketone | | | | | | | 1.0 |
| (d1) | Hindered amine 1 | 0.2 | | | 0.2 | 0.5 | 1.0 | 0.2 |
| (d2) | Hindered amine 2 | | 0.2 | | | | | |
| (d3) | Hindered amine 3 | | | 0.2 | | | | |
| (d'1) | Hindered amine 4 | | | | | | | |
| (d'2) | Hindered phenol 1 | | | | | | | |
| (d'3) | Hindered phenol 2 | | | | | | | |
| (d'4) | Hindered phenol 3 | | | | | | | |
| | Mercapto group/vinyl group (mol/mol) | 0.60 | 0.60 | 0.60 | 0.60 | 0.60 | 0.60 | 0.60 |
| | Results of Performance Evaluation | | | | | | | |
| | Penetration (initial) | 57 | 59 | 55 | 49 | 58 | 59 | 57 |
| | Penetration (after 500 h at 85° C., 85RH) | 62 | 62 | 58 | 53 | 62 | 62 | 65 |
| | Penetration Variation | +5 | +3 | +3 | +4 | +4 | +3 | +8 |
| | G* (initial) (Pa) | 2300 | 2200 | 2500 | 2800 | 2200 | 2200 | 2300 |
| | G* (after 500 h at 85° C., 85RH) (Pa) | 2000 | 2000 | 2300 | 2600 | 2100 | 2100 | 1900 |
| | G* Variation (Pa) | −300 | −200 | −200 | −200 | −100 | −100 | −400 |
| | Tanδ (initial) | 0.62 | 0.65 | 0.62 | 0.63 | 0.61 | 0.60 | 0.65 |
| | Tanδ (after 500 h at 85° C., 85RH) | 0.67 | 0.67 | 0.65 | 0.68 | 0.68 | 0.67 | 0.67 |
| | Tanδ Variation | 0.05 | 0.02 | 0.03 | 0.05 | 0.07 | 0.07 | 0.02 |

TABLE 2

| | Constituents | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|
| (a1) | Organopolysiloxane base 1 | 100 | 100 | 100 | 100 | 100 | 100 | | | |
| (a2) | Organopolysiloxane base 2 | | | | | | | 100 | | |
| (a'1) | Organopolysiloxane base 4 | | | | | | | | 100 | 100 |
| (b1) | Mercaptopropyl group-containing organopolysiloxane | 6.0 | 6.0 | 6.0 | 6.0 | 6.0 | 6.0 | 4.3 | | |
| (c1) | 2-Hydroxy-2-methyl-1-phenyl-propan-1-one | 1.0 | 1.0 | 1.0 | 1.0 | 1.0 | | 1.0 | 1.0 | 1.0 |
| (c2) | 1-Hydroxy-cyclohexyl-phenyl-ketone | | | | | | 1.0 | | | |
| (d1) | Hindered amine 1 | | | | | | | | | 0.2 |
| (d2) | Hindered amine 2 | | | | | | | | | |
| (d3) | Hindered amine 3 | | | | | | | | | |
| (d'1) | Hindered amine 4 | 0.2 | | | | | | | | |
| (d'2) | Hindered phenol 1 | | 0.2 | | | | | | | |
| (d'3) | Hindered phenol 2 | | | 0.2 | | | | | | |
| (d'4) | Hindered phenol 3 | | | | 0.2 | | | | | |
| | Mercapto group/vinyl group (mol/mol) | 0.60 | 0.60 | 0.60 | 0.60 | 0.60 | 0.60 | 0.60 | | |

TABLE 2-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|
| Results of Performance Evaluation | | | | | | | | | |
| Penetration (initial) | 54 | 58 | 57 | 56 | 58 | 58 | 50 | 56 | 56 |
| Penetration (after 500 h at 85° C., 85RH) | 65 | 68 | 67 | 64 | 70 | 73 | 61 | 80 | 79 |
| Penetration Variation | +11 | +10 | +10 | +8 | +12 | +15 | +11 | +24 | +23 |
| G* (initial) (Pa) | 2500 | 2300 | 2300 | 2300 | 2300 | 2300 | 2800 | 2400 | 2400 |
| G* (after 500 h at 85° C., 85RH) (Pa) | 1600 | 1500 | 1600 | 1800 | 1400 | 1300 | 2000 | 1000 | 1100 |
| G* Variation (Pa) | −900 | −800 | −700 | −500 | −900 | −1000 | −800 | −1400 | −1300 |
| Tanδ (initial) | 0.62 | 0.67 | 0.62 | 0.60 | 0.67 | 0.70 | 0.58 | 0.65 | 0.65 |
| Tanδ (after 500 h at 85° C., 85RH) | 0.78 | 0.81 | 0.78 | 0.73 | 0.81 | 0.87 | 0.67 | 0.96 | 0.96 |
| Tanδ Variation | 0.16 | 0.14 | 0.16 | 0.13 | 0.14 | 0.17 | 0.09 | 0.31 | 0.31 |

TABLE 3

| | | | Ex. 8 | Ex. 9 | Ex. 10 | Ex. 11 | Ex. 12 | Ex. 13 |
|---|---|---|---|---|---|---|---|---|
| | | Constituents | | | | | | |
| (a3) | | Organopolysiloxane base 3 | 100 | 100 | 100 | 100 | 100 | 100 |
| (a'1) | | Organopolysiloxane base 4 | | | | | | |
| (b1) | | Mercaptopropyl-group-containing organopolysiloxane | 3.2 | 3.2 | 3.2 | 3.2 | 3.2 | 3.2 |
| | | Fumed silica | 9.0 | 9.0 | 9.0 | 9.0 | 9.0 | 9.0 |
| (c1) | | 2-Hydroxy-2-methyl-1-phenyl-propan-1-one | 1.0 | 1.0 | 1.0 | 1.0 | 1.0 | |
| (c2) | | 1-Hydroxy-cyclohexyl-phenyl-ketone | | | | | | 1.0 |
| (d1) | | Hindered amine 1 | 0.2 | | | 0.5 | 2.0 | 2.0 |
| (d2) | | Hindered amine 2 | | 0.2 | | | | |
| (d3) | | Hindered amine 3 | | | 0.2 | | | |
| (d'1) | | Hindered amine 4 | | | | | | |
| (d'2) | | Hindered phenol 1 | | | | | | |
| (d'3) | | Hindered phenol 2 | | | | | | |
| (d'4) | | Hindered phenol 3 | | | | | | |
| | | Mercapto group/vinyl group (mol/mol) | 0.55 | 0.55 | 0.55 | 0.55 | 0.55 | 0.55 |
| | | Results of Performance Evaluation | | | | | | |
| | | Penetration (initial) | 51 | 54 | 52 | 58 | 59 | 51 |
| | | Penetration (after 500 h at 85° C., 85RH) | 53 | 56 | 55 | 62 | 62 | 56 |
| | | Penetration Variation | +2 | +2 | +3 | +4 | +3 | +5 |
| | | Pressure Resistance (initial), MPa | 0.36 | 0.35 | 0.35 | 0.34 | 0.33 | 0.36 |
| | | Pressure Resistance (after 500 h at 85° C., 85RH), MPa | 0.20 | 0.18 | 0.17 | 0.19 | 0.18 | 0.16 |
| | | Pressure Resistance Variation, MPa | −0.16 | −0.17 | −0.18 | −0.15 | −0.15 | −0.20 |

TABLE 4

| | | | Comp. Ex. 10 | Comp. Ex. 11 | Comp. Ex. 12 | Comp. Ex. 13 | Comp. Ex. 14 | Comp. Ex. 15 | Comp. Ex. 16 | Comp. Ex. 17 |
|---|---|---|---|---|---|---|---|---|---|---|
| | | Constituents | | | | | | | | |
| (a3) | | Organopolysiloxane base 3 | 100 | 100 | 100 | 100 | 100 | 100 | | |
| (a'1) | | Organopolysiloxane base 4 | | | | | | | 100 | 100 |
| (b1) | | Mercaptopropyl group-containing organopolysiloxane | 3.2 | 3.2 | 3.2 | 3.2 | 3.2 | 3.2 | | |
| | | Fumed silica | 9.0 | 9.0 | 9.0 | 9.0 | 9.0 | 9.0 | | |
| (c1) | | 2-Hydroxy-2-methyl-1-phenyl-propan-1-one | 1.0 | 1.0 | 1.0 | 1.0 | 1.0 | | 1.0 | 1.0 |
| (c2) | | 1-Hydroxy-cyclohexyl-phenyl-ketone | | | | | | 1.0 | | |
| (d1) | | Hindered amine 1 | | | | | | | | 0.2 |
| (d2) | | Hindered amine 2 | | | | | | | | |
| (d3) | | Hindered amine 3 | | | | | | | | |
| (d'1) | | Hindered amine 4 | 0.2 | | | | | | | |
| (d'2) | | Hindered phenol 1 | | 0.2 | | | | | | |

TABLE 4-continued

|  | Comp. Ex. 10 | Comp. Ex. 11 | Comp. Ex. 12 | Comp. Ex. 13 | Comp. Ex. 14 | Comp. Ex. 15 | Comp. Ex. 16 | Comp. Ex. 17 |
|---|---|---|---|---|---|---|---|---|
| (d'3) Hindered phenol 2 |  |  | 0.2 |  |  |  |  |  |
| (d'4) Hindered phenol 3 |  |  |  | 0.2 |  |  |  |  |
| Mercapto group/vinyl group (mol/mol) | 0.55 | 0.55 | 0.55 | 0.55 | 0.55 | 0.55 |  |  |
| Results of Performance Evaluation |  |  |  |  |  |  |  |  |
| Penetration (initial) | 49 | 49 | 54 | 51 | 53 | 53 | 56 | 56 |
| Penetration (after 500 h at 85° C., 85RH) | 58 | 58 | 64 | 62 | 65 | 68 | 80 | 79 |
| Penetration Variation | +9 | +9 | +10 | +11 | +12 | +15 | +24 | +23 |
| Pressure Resistance (initial), MPa | 0.35 | 0.37 | 0.35 | 0.35 | 0.35 | 0.35 | 0.33 | 0.33 |
| Pressure Resistance (after 500 h at 85° C., 85RH), MPa | 0.10 | 0.09 | 0.05 | 0.05 | 0.06 | 0.03 | 0.01 | 0.02 |
| Pressure Resistance Variation, MPa | −0.25 | −0.28 | −0.30 | −0.30 | −0.29 | −0.32 | −0.32 | −0.31 |

While the present invention has been described in detail with reference to specific embodiments thereof, it will be apparent to one skilled in the art that various changes and modifications can be made therein without departing from the spirit and scope thereof.

Incidentally, the present application is based on Japanese Patent Applications No. 2010-101249 filed on Apr. 26, 2010, and the contents are incorporated herein by reference.

INDUSTRIAL APPLICABILITY

The photocurable silicone gel composition of the invention cures upon irradiation with light. The cured product thereof undergoes little change in penetration even when exposed to high temperature and high humidity, and further has excellent shape retention, vibration absorption, and sealing properties. Accordingly, applications to a wide range of fields are possible, including adhesives for various electrical/electronic parts, sealing agents, potting materials, coating materials, damping materials for use in optical pickup devices, and the like. In particular, as a damping material, it can be applied to an optical pickup device which is required to have high reliability, and, as a sealing agent, it can be applied to a part for use in vehicles, which is exposed to high temperature and high humidity. Accordingly, the invention is applicable to a wide range of fields and thus industrially useful.

The invention claimed is:

1. A photocurable silicone gel composition comprising:
(A) an organopolysiloxane having at least one group represented by the following general formula (1):

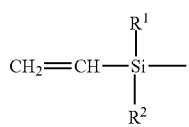

(1)

wherein R1 and R2 each represent hydrogen or an alkyl group having a carbon number of 1 to 20, in an amount of 100 parts by mass;
(B) a mercaptoalkyl group-containing organopolysiloxane in an amount of parts by mass such that the number of moles of the mercaptoalkyl group is 0.01 to 1.0 mole per 1 mole of the group represented by the general formula (1) in the component (A);
(C) a photopolymerization initiator in an amount of 0.01 to 20 parts by mass per 100 parts by mass of the component (A); and
(D) a hindered amine compound having a group represented by the following general formula (2):

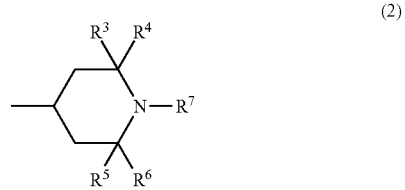

(2)

wherein $R^3$ to $R^6$ each represent hydrogen or an alkyl group having a carbon number of 1 to 20, and $R^7$ represents hydrogen or —$CH_2$—$R^8$ in which $R^8$ represents hydrogen or a monovalent organic group, in an amount of 0.001 to 10 parts by mass per 100 parts by mass of the component (A).

2. The photocurable silicone gel composition according to claim 1, wherein the component (A) has a viscosity at 25° C. of 10 to 100,000 cps.

3. The photocurable silicone gel composition according to claim 1, wherein the component (B) is a mercaptoalkyl group-containing organopolysiloxane including a $(CH_3)_3SiO_{1/2}$ unit, a $(CH_3)(HS(CH_2)_n)SiO_{2/2}$ unit in which n is an integer of 2 to 20, and a $(CH_3)_2SiO_{2/2}$ unit.

4. The photocurable silicone gel composition according to claim 1, for use as a damping material for an optical pickup.

5. The photocurable silicone gel composition according to claim 1, for use as a sealing agent.

6. The photocurable silicone gel composition according to claim 5, for use as a sealing agent for an in-vehicle electronic device.

7. The damping material for an optical pickup, comprising a cured product obtained by curing the photocurable silicone gel composition according to claim 1 by irradiation with light.

8. A method for sealing, comprising:
applying the photocurable silicone gel composition according to claim 1 to an article to be sealed;
curing the photocurable silicone gel composition by irradiation with light; and
joining a resulting cured product to an opposing article to be sealed to contact the articles by pressuring.

* * * * *